Sept. 5, 1950 J. H. HOMRIGHOUS 2,521,010

TELEVISION SYSTEM

Filed Dec. 29, 1945 5 Sheets-Sheet 1

INVENTOR.

John H. Homrighous

Sept. 5, 1950 J. H. HOMRIGHOUS 2,521,010

TELEVISION SYSTEM

Filed Dec. 29, 1945 5 Sheets-Sheet 2

INVENTOR.

John H. Homrighous

Sept. 5, 1950 J. H. HOMRIGHOUS 2,521,010

TELEVISION SYSTEM

Filed Dec. 29, 1945 5 Sheets-Sheet 3

INVENTOR.

John H. Homrighous

Sept. 5, 1950 J. H. HOMRIGHOUS 2,521,010

TELEVISION SYSTEM

Filed Dec. 29, 1945 5 Sheets-Sheet 4

INVENTOR.

John H. Homrighous

INVENTOR.
John W. Homrighous

Patented Sept. 5, 1950

2,521,010

UNITED STATES PATENT OFFICE 2,521,010

TELEVISION SYSTEM

John H. Homrighous, Oak Park, Ill.

Application December 29, 1945, Serial No. 638,038

2 Claims. (Cl. 178—5.2)

This invention relates to radio communication systems and more particularly to a television system for the transmission and reception of color pictures.

One of the objects of my invention is the provision of improved means for the transmission and reception of picture signals representative of different colors.

Another object of the instant invention is to provide at a transmitting station means for producing picture signals corresponding to different colors in a scene without mechanically moving mechanisms.

Another object is the provision of means for reflecting and passing incoming light rays to provide simultaneously on a cathode ray tube screen several images of the same scene.

Another object is to provide picture alignment marks in the reproduced pictures for properly adjusting the projecting mechanism to project several pictures at the same time to a common screen.

Messages in this specification are to be understood to include any intelligence represented by sound or picture signals.

The scanning control system described in this specification may be similar to my "Self-synchronizing system" shown and described in co-pending applications Serial No. 451,722, filed July 21, 1942, now Patent No. 2,398,641, issued April 16, 1946, and Serial No. 476,897 filed Feb. 24, 1943, or the system shown in co-pending application Serial No. 542,317, filed June 27, 1944, in that line control pulses may return the cathode ray from any location on its associated screen, in the receiving station, to the starting point for the next horizontal line, and the field control pulses may return the cathode ray from any location on its associated screen, in the receiver, to the starting point for the first horizontal line in another frame or picture.

This control system may be known also as "the follow up system," that is, the scanning mechanism at the receiving station is not driven into synchronism but follows the horizontal and vertical movements of the scanning mechanism at the transmitting station.

Several methods for developing picture signals representative of different colors in the scene being televised have been devised which make use of mechanical moving parts. In the instant invention colors are converted into groups of varying densities of gray on cathode ray tube screens, and these grays are translated back into the original colors again without the aid of mechanically moving mechanisms.

In my prior application Serial No. 542,317, I have shown a system for the transmission and reception of picture signals and both accompanying picture related sound signals and time of day sound signals on a common carrier wave with means for listening to either sound message as desired. In the instant invention sound signals for weather reports, etc, are transmitted on the same carrier wave with the picture signals, but the sound signals related to the pictures may be transmitted on a separate carrier wave, with means at the receiving station for switching from the reception of one sound message to the other as desired.

In my prior aplication Serial No. 476,897, I have shown means for automatically changing the focus of the images produced on a cathode ray tube screen to give the appearance of depth. In the instant case I change the horizontal velocity of the electron ray in alternate frames to produce images slightly offset in two directions to give the appearance of depth in the reproduced pictures.

Cathode ray projecting tubes have been devised for projecting the images produced on their screens to a larger distant screen, but none of these tubes have been adaptable for developing three images of the same scene simultaneously on the cathode ray tube screen and projecting these to a larger distant screen.

Other objects and advantages will appear from the following description taken in connection with the accompanying drawings in which: Figures 1 and 8 are simplified diagrammatic views of a television transmitting station and a television receiving station respectively, illustrating the principles applied in this invention.

Figures 1, 2:
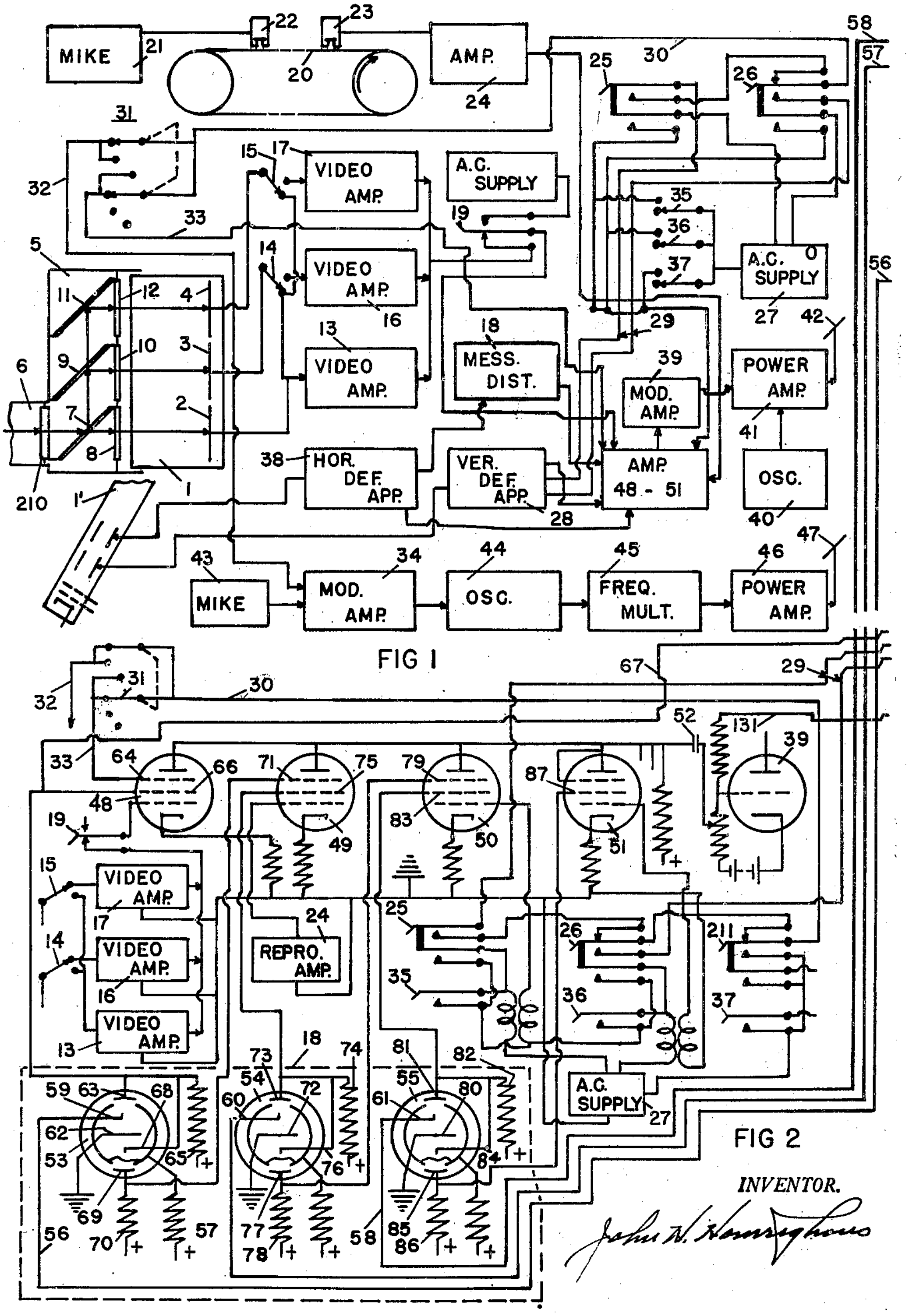
Figure 2 is a circuit diagram showing the message distributor illustrated in Figure 1.

Figure 1 shows a block diagram for a television transmitting station comprising a cathode ray tube having light ray reflecting and passing devices for projecting three images of the same scene on its mosaic screen and to produce picture signals representative of the different colors in the scene within the view of the tube. This transmitting station also comprises cathode ray deflecting apparatus and associated circuits, and a message distributor for allotting periods of time for picture signals, sound and various control signals in order to modulate the several signals in sequence on a common carrier. Other apparatus and associated circuits are provided for a frequency modulated carrier to transmit sound signals relating to the pictures. Further equipment is provided for periodically varying the amplification of the modulated signals and for giving three dimensional effects in the reproduced pictures.

Figure 2 shows the message distributor for allotting periods of time in the interval for each saw tooth wave to transmit picture signals in a first period, sound signals pertaining to information data in a second period and various control signals in several other periods.

Figure 3:
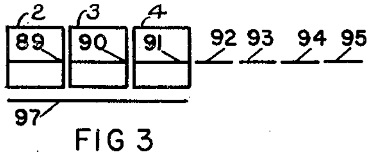
Figure 3 is a graphical view illustrating the time periods for the various messages including control signals.

Figure 3 illustrates graphically the periods of time that may be allotted to each of the several messages and the control trigger signals during the interval of one saw tooth wave.

Figures 4, 5:
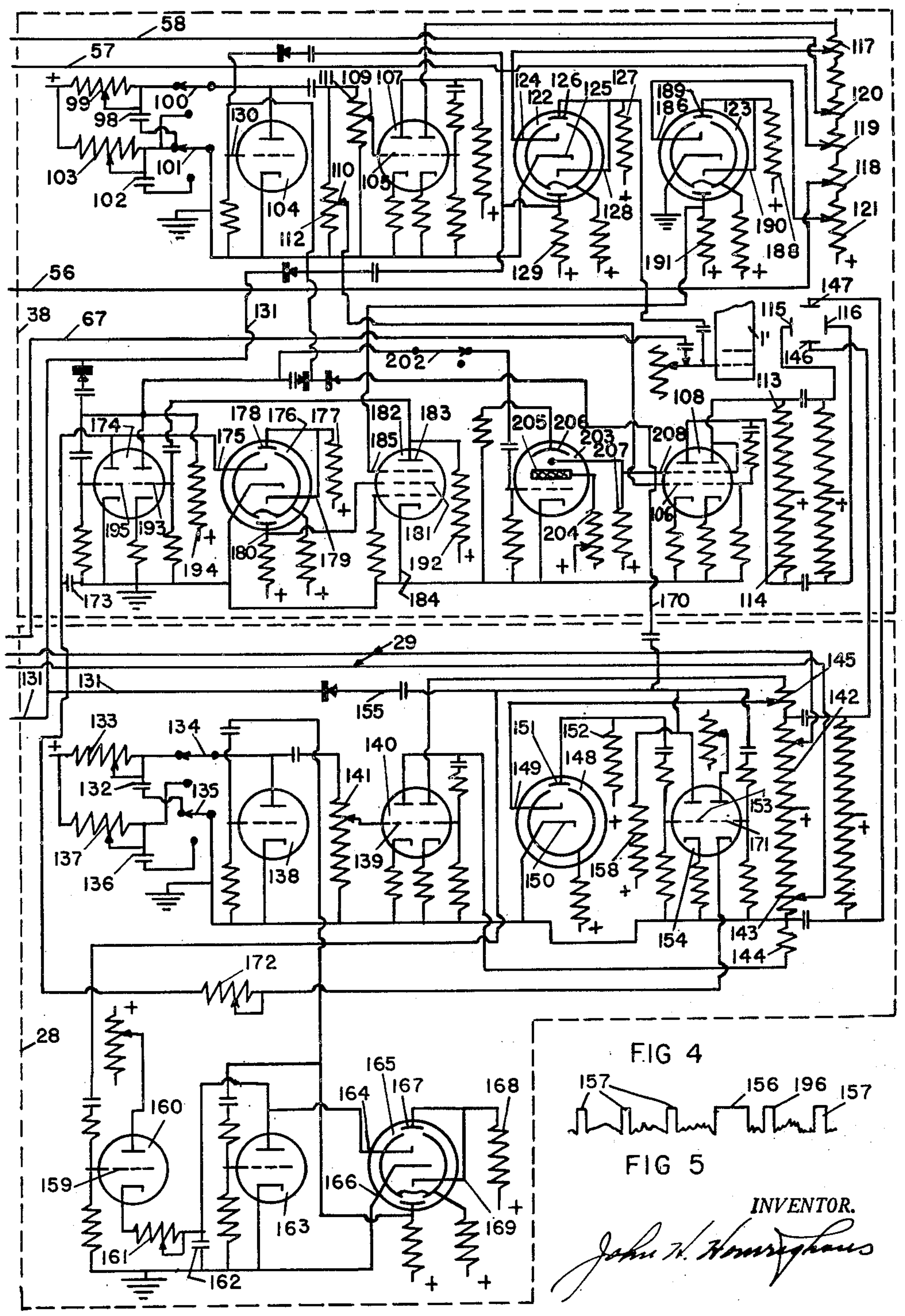
Figure 4 is a circuit diagram showing the horizontal and vertical deflecting apparatus illustrated in Figure 1.
Figure 5 is a graphical view illustrating horizontal and vertical control signals.

Figure 4 shows apparatus and associated circuits for horizontal and vertical deflection including means for producing relatively narrow horizontal control or trigger impulses and relatively wide vertical control or trigger impulses. Other apparatus with suitable circuits are provided to vary the horizontal velocity of the electron ray in certain fields to produce three dimensional effects in the reproduced images, to be further explained later.

Figure 5 illustrates graphically horizontal and vertical control or synchronizing signals produced in the saw tooth wave generator at the transmitter.

Figure 6:
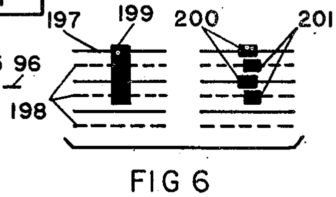
Figure 6 illustrates odd and even lines in a picture frame.

Figure 6 illustrates a method for scanning the mosaic screen to produce offset images on the viewing screen.

Figure 7:
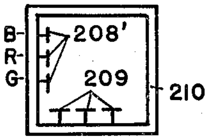
Figure 7 shows a picture alignment mark panel.

Figure 7 shows picture alignment panel to indicate proper alignment of two or more picture images on the same screen area.

Figure 8:
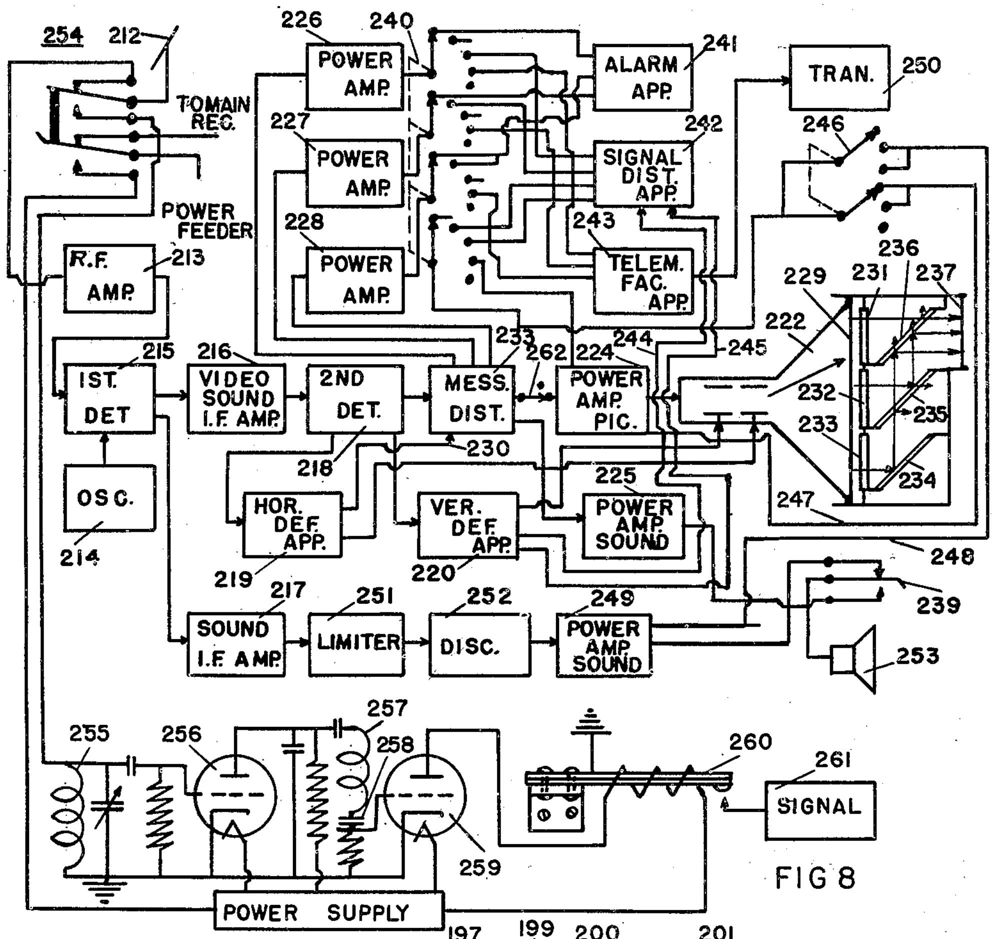

Figure 8 shows a block diagram for a television receiving station comprising a cathode ray tube having light reflecting and passing devices for projecting two or more images from the cathode ray tube screen simultaneously on the same distant screen area to produce picture images in natural color. This receiving station also comprises cathode ray deflecting apparatus and associated circuits, and a message distributor for allotting predetermined periods of time for picture signals, sound and various control signals in order that each type or set of signals may be separated and individually reproduced. Other apparatus and associated circuits are provided for demodulating the sound signals closely associated with the reproduced pictures and received over a second carrier wave.

Figure 9:
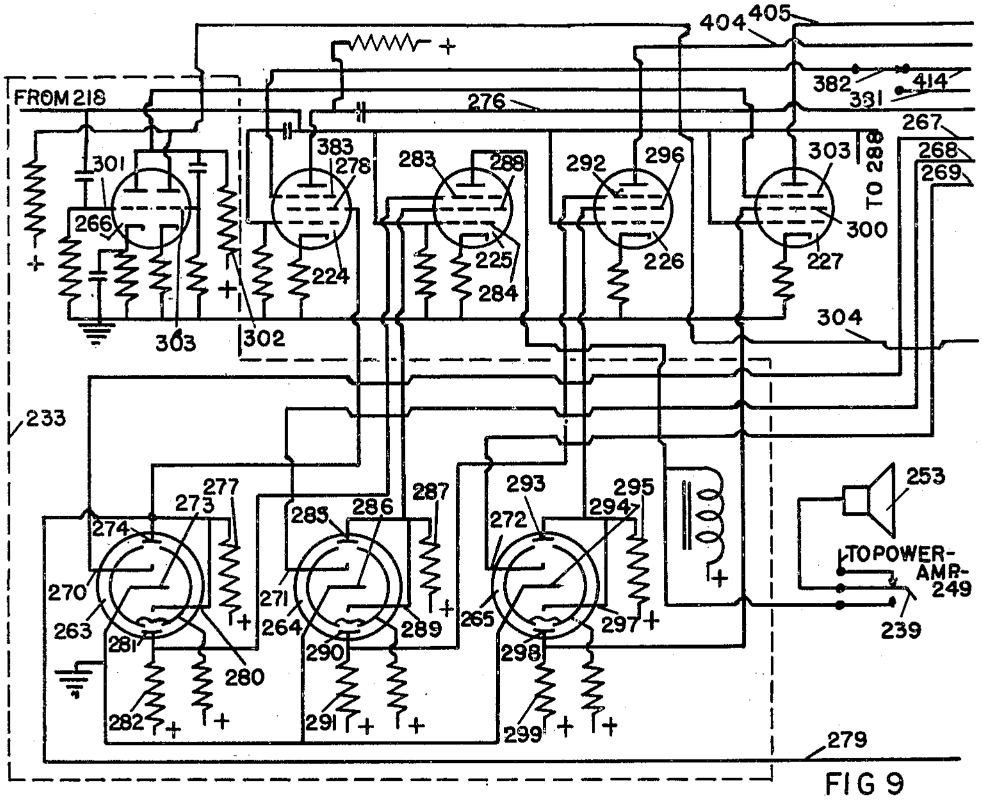
Figure 9 is a circuit diagram showing the message distributor illustrated in Figure 8.

Figure 9 shows the message distributor for the receiving station illustrated in Figure 8 for allotting predetermined periods of time in each saw tooth wave for each message to be received.

Figure 10:
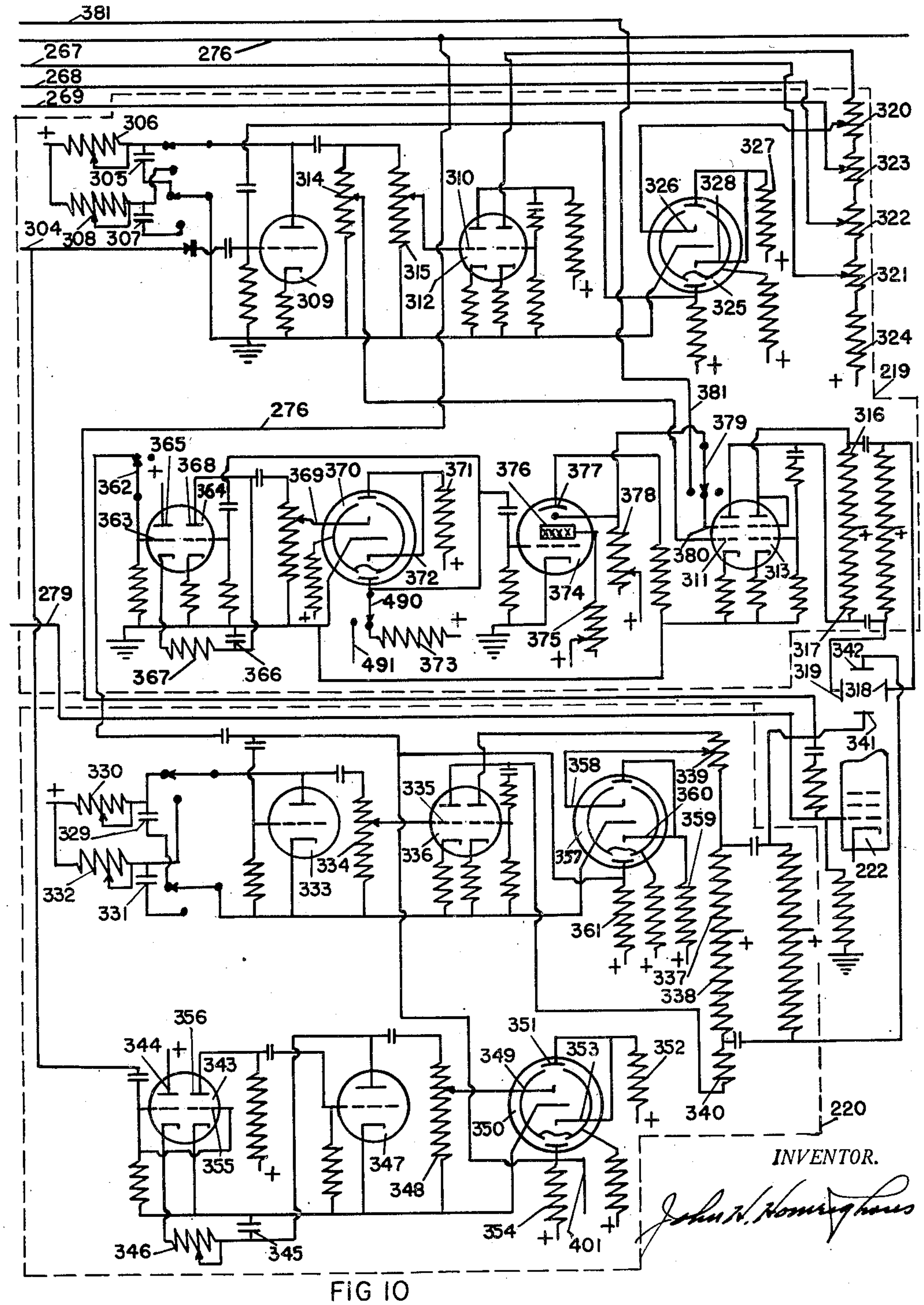
Figure 10 is a circuit diagram showing the horizontal and vertical deflecting apparatus illustrated in Figure 8.

Figure 10 shows the horizontal and vertical deflecting apparatus and associated circuits for moving the electron ray over the cathode ray tube screen, and other apparatus with suitable circuits is provided to vary the horizontal velocity of the electron ray in certain fields to produce three dimensional effects in the reproduced images, to be explained in more detail later.

Figure 11:
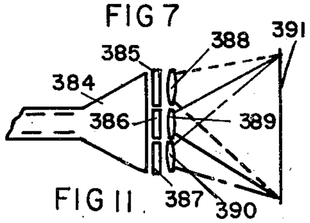
Figure 11 shows a cathode ray tube for projecting images to a distant screen.

Figure 11 shows another arrangement for projecting three picture images at the same time onto the same distant screen area.

With reference to Figure 1 the numeral 1 shows a partial top view and 1' the stem or pocket of a cathode ray transmitting tube of conventional type, such as the iconoscope, having one screen, or the mosaic photoelectric image screen may be divided into three vertical sections 2, 3 and 4 on which images of the same object or scene are projected by the light ray passing and reflecting system or devices in the compartment 5. The cathode ray tube also comprises an electron gun for generating a ray of electrons directed toward the screens and two sets of deflecting plates for deflecting the electron ray at the line and field frequencies, so that it is caused to scan the several screens in sequence.

Light rays entering the lens system illustrated at 6 are divided at the partially silvered mirror 7, some passing through the mirror and color filter 8 onto the image screen 2. The rays reflected from the mirror 7 are directed toward the second partially silvered mirror 9; the rays reflected from the mirror are directed through the color filter 10 onto the image screen 3. The rays passing through the mirror 9 are directed toward the opaque mirror 11 where they are reflected through the color filter 12 onto the image screen 4. While I have shown mirrors as the preferred form of my invention, it is to be understood that an optical system may be employed in place of the mirrors 7, 9 and 11.

Picture signals are developed by the electron ray scanning the several screens in tube 1 and are fed to video frequency amplifier 13. By operation of the switches 14 and 15, the amplifiers 16 and 17 may be employed to provide individual amplification for each image screen; from the amplifier 13 or the amplifiers 13, 16 and 17 the video or picture signals are fed to one of the amplifiers 48 to 51 through contacts in key 19. The key 19 is operated to provide a relatively long period of alarm signals or interrupted alarm signals in the picture period of time for signaling a receiving station by either code signaling or uninterrupted signaling to be further explained later. Sound signals representative of weather reports and time of day messages, recorded on an endless magnetic wire 20 through the microphone 21 and recording coil 22 are reproduced by the coil 23, amplified at 24 and fed to one of the amplifiers 48 to 51. The operation of keys 25 and 26 and other keys not shown may apply alternating current from the source 27 to certain of the amplifiers 48 to 51 during two or more predetermined periods in each saw tooth wave for controlling the output signal amplification in the receiving station, to be more fully explained later. The keys 25 and 26 also close circuits from the vertical deflecting apparatus 28 over either conductor of a pair 29, common conductor 30, switch 31 and either or both conductors 32 and 33 to one of the amplifiers 48 to 51 and the modulation amplifier 34 to periodically vary the picture and sound signal outputs in accordance with the vertical saw tooth waves developed in 28. The switches 31 may control the application of the saw tooth waves to either the picture signals or the sound signals closely associated with the pictures or to both sets of signals as desired.

The individual keys 35, 36 and 37 may apply alternating current from the source 27 to certain of the amplifiers 48 to 51 thereby controlling an oscillator at the receiving station for varying the signal output, which will be explained later.

The message distributor 18 allots suitable periods of time during each horizontal saw tooth wave produced in the horizontal deflecting apparatus 38 for picture signals, fragments of sound signals and fragments of two or more alternating current signals which are fed to the modulation amplifier 39 together with the horizontal control signals from the deflecting apparatus 38 appearing at the end of each horizontal deflection, and the vertical control signals from the vertical deflecting apparatus 28 appearing between the image fields.

A carrier wave is produced by the oscillator 40. In the power amplifier 41 this carrier wave is modulated from the amplifier 39 by the picture signals, sound signals, alternating current signals, and control signals which are applied to the antenna 42.

Sound signals closely related to the pictures are developed at the microphone 43 and fed to the reactance modulator amplifier 34. The signals from the modulation amplifier 34 are fed to the oscillator 44 and are then applied to the frequency multiplying amplifier 45 thereby producing a high frequency modulated carrier wave which is further amplified at 46 and fed to the antenna 47.

The filters 8, 10 and 12 which may be blue, red and green respectively are preferably mounted in a frame that may be easily removed from the compartment 5 so that picture signals representative of black and white only may be developed in tube 1. The mirror 7 may also be removed, thereby producing only one image on the screen 2 for facsimile communication when color is not desired.

With reference to Figure 2, the message distributor 18 for allotting suitable periods of time in a series of saw tooth waves for several messages and control signals comprises multi-element amplifier tubes 48, 49, 50 and 51 having their anodes connected together and coupled through condenser 52 to the grid of the modulating amplifier 39. Video amplifier 13, or amplifier 13, 16 and 17 may be connected in the cathode grid circuit of amplifier 48. Reproduction amplifier 24 is connected in the cathode grid circuit of amplifier 49. The operation of keys 35 and 36 supply alternating current signals to the cathode grid circuits of amplifiers 50 and 51 respectively. Other amplifiers in multiple with tubes 48 through 51 may be provided for controlling the transmission of other signals.

Off and on relay or impulse tubes 53, 54 and 55 and other like tubes throughout this specification may be similar to those described in my copending application Serial Number 521,337, filed February 7, 1944, Patent No. 2,442,565, issued June 1, 1948. To describe briefly the electrons may be rotated from and onto the small high potential anodes by changes in voltage on the control electrodes.

These tubes 53, 54 and 55 are controlled by saw tooth potentials developed in the apparatus and associated circuits of Figure 4 and applied over conductors 56, 57 and 58 to the control electrodes 59, 60 and 61 respectively. As each saw tooth wave is developed for deflecting the electron ray forward over its associated screen, to be explained later, the gradually increasing potential is applied to the control electrodes 59, 60 and 61 which may be adjusted in the circuits of Figure 4 so that the potential on control electrode 59 may permit the electrons from the cathode 62 to flow to the anode 63 at the time the electron ray in the cathode ray tube 1 reaches the leaving edge of the image screen 2 so that the picture signals developed on the forward horizontal movement of the electron ray are fed to the input circuit of the amplifier tube 48. The output of tube 48 is applied to the control grid of modulation amplifier 39. Grid 64 is not effective to control the amplification with switch 25 in nonoperated position. Current flowing through the anode 63, cathode 62 circuit of tube 53 causes a potential drop at the load resistor 65 which is applied to the grid 66 of tube 48 to block any signaling current in this tube during further increases in the saw tooth potential. The drop in potential at resistor 65 is also applied over conductor 67 to the control electrode in the cathode ray tube 1, Figure 4, to substantially extinguish the electron ray during further increases in the saw tooth potentials.

The potential drop at the load resistor 65 is applied to the control electrode 68 which may rotate or block the electrons from the anode 69, thereby increasing the potential at load resistor 70 which is applied to the grid 71 in tube 49 thus permitting sound signals from the amplifier 24 to be supplied to the control grid of the modulation amplifier 39 immediately after the picture signals were modulated. However, after a short period of time for modulating the sound signals from amplifier 24 the saw tooth potential on the control electrode 60 in tube 54 will have increased to permit electrons to flow from the cathode 72 to the anode 73, thus producing a potential drop at the load resistor 74 which is applied to the grid 75 in tube 49 to block the cathode anode signaling current through the tube 49. The potential drop at resistor 74 is also applied to control electrode 76, which drives the electrons from anode 77, thus increasing the potential at the load resistor 78 and to the grid 79 in tube 50. The increase in potential on grid 79 renders tube 50 conductive to alternating current signals from the alternating current source 27 (provided either key 25 or 35 is operated) immediately after the sound signals from amplifier 24 have been blocked. After the tube 50 has become conductive for a short period, the saw tooth potential on the control electrode 61 in tube 55 will have increased to permit electrons to flow from the cathode 80 to the anode 81 in tube 55, thus producing a potential drop at the load resistor 82 which is applied to the grid 83 in tube 50 to block the cathode anode current through tube 50. The potential drop at resistor 82 is also applied to control electrode 84, which drives the electrons from anode 85, thus increasing the potential at the load resistor 86 and to the grid 87 in tube 51. The increase in potential on grid 87 renders tube 51 conductive to alternating current signals from the source of alternating current 27 (provided either key 26 or 36 is operated) immediately after tube 50 has been blocked.

While I have shown only two amplifiers for alternating current allotments, it is to be understood that other amplifiers may be employed similar to the amplifiers 50 and 51 to transmit other series of fragmentary signals.

A short period of time after tube 51 has become conductive control signals are developed in the circuits of Figure 4 to trigger the saw tooth voltages and to restore the circuits of Figure 2 to start another group of signals comprising picture signals, sound signals and a number of other auxiliary signals through the amplifiers 48, 49, 50 and 51.

Referring to Figure 3, the different periods of time for the several different signals may be as illustrated wherein 2, 3 and 4 may represent the mosaic image screens and the lines 89, 90 and 91 the periods of time for the three sets of picture signals in each horizontal deflection, line 92 may represent the period of time for sound signals representative of data on the weather and time of day, lines 93, 94 and 95 may represent the periods of time for auxiliary or alternating current signals, and line 96 may represent the period of time for horizontal control or trigger signals. While I have illustrated the mosaic screen divided into three sections, it is to be understood that the conventional type having only one part may be employed and the line 97 would then represent the period of time for the picture signals, which would be followed by the other signals as illustrated by the lines 92 through 96; furthermore the period of time for any of the several signals 92 through 95 may be varied to suit conditions.

From the above description it is seen that picture signals and fragmentary portions of a number of other types of signals may be modulated in successive rotation on a single carrier wave. The horizontal line deflection may be at a relatively high frequency, which causes the sound and other various signals to be interrupted at the same rate. The rate of interruption being relatively high and near or above audibility, they will not cause objectionable interference in the sound reproduction.

With reference to Figure 4 the apparatus and associated circuits 38 for producing horizontal sweep voltages comprise a condenser 98 charged through an adjustable resistor 99 from a source of positive potential as indicated. By movement of the switches 100 and 101 another condenser 102 may be charged through resistor 103 from a source of positive potential to vary the line frequency for horizontal deflection. Other line frequency variations may be obtained by providing other resistors and condensers connected to the vacant switch contacts.

When the condenser 98 or 102 becomes charged, depending upon which switch contacts are closed, the saw tooth voltage wave in the plate circuit of tube 104 is impressed on the grids 105 and 106 of multi unit tubes 107 and 108 through adjustable contacts 109 and 110 on resistors 111 and 112 respectively. The contacts 109 and 110 are for adjusting the amplitude of saw tooth voltage wave. The double anode output of the amplifier 108 supplied to load resistors 113 and 114 will change the potential on the horizontal deflecting plates 115 and 116 of tube 1 to effect in a well known manner the horizontal movement of the electron ray.

The output of tube 107 at resistors 117 through 121 supplies potential variations to the control electrodes in tubes 122 and 123, and tubes 53, 54 and 55 in Figure 2. To initiate the discharge of condenser 98 or 102, I provide an off and on relay tube 122 having control electrode 124 connected to the load resistor 117. As the saw tooth voltage increases to a suitable amplitude to cover the time periods for picture, sound, and auxiliary signals the electrode 124 becomes more positive, permitting the electrons to flow from the cathode 125 to the anode 126 causing a voltage drop at load resistor 127 which is applied to the control electrode 128 thereby increasing the potential at load resistor 129 to produce a positive pulse which may be applied to the grid 130 of the trigger tube 104 rendering this tube conductive to discharge the condenser 98 or 102, thus returning the cathode ray to start scanning the next horizontal line. The discharge of condenser 98 produces a potential drop in load resistor 117 which is applied to the control electrode 124 to drive or rotate the electrons from the anode 126. Likewise the potential drop in load resistors 118, 119 and 120, supplied over conductors 56, 57 and 58 to the control electrode 59, 60 and 61 in tubes 53, 54 and 55 restores the circuits of the message distributor 18 to the proper condition to again start modulating picture signals.

The positive impulse developed at load resistor 129 may be supplied over conductor 131 to the grid of modulation amplifier 39 to modulate the carrier with an impulse during horizontal retrace, or as the condenser 98 is being discharged, to control the scanning action in the receiving stations. The voltage drop at resistor 127, tube 122 may be applied to the control grid of the cathode ray tube 1 to substantially extinguish the electron ray during retrace.

From the foregoing it will be understood that the tube 122 initiates the control impulse for terminating the saw tooth wave which causes the carrier wave to be modulated with a high amplitude signal after the termination of each group of signals comprising picture signals and fragmentary portions of sound and several auxiliary signals; furthermore, line frequency may be varied to meet any operating condition.

The apparatus and associated circuits 28 for producing vertical sweep voltages may be similar to the apparatus and circuits employed for horizontal sweep voltages, and comprises a condenser 132 charged through an adjustable resistance 133 from a source of positive potential as indicated. By the operation of the switches 134 and 135 another condenser 136 may be charged through resistor 137 from a source of potential to vary the frame frequency. When condensers 132 or 136 become charged depending upon which switch contacts are closed, the saw tooth voltage wave in the plate circuit of tube 138 is impressed on the grid 139 of multiunit tube 140 through an adjustable resistor 141 for adjusting the amplitude of the vertical saw tooth waves. The double anode output of tube 140 supplied to the load resistors 142, 143, 144 and 145 will change the potential on the vertical deflecting plates 146 and 147 of tube 1 to effect the vertical forward movement of the electron ray.

To initiate the discharge of condenser 132 or 136, I provide an off and on impulse tube 148 having its control electrode 149 connected to the load resistor 145. As the vertical saw tooth voltage increases to a suitable amplitude to cause the cathode ray to travel vertically over the screen, the electrode 149 becomes more positive thus permitting electrons to flow from the cathode 150 to the anode 151 causing a voltage drop at load resistor 152 which is applied to the control grid 153 in tube 154 thereby causing a positive pulse to be supplied over conductor 155 and 131 to the grid of modulation amplifier 39, to modulate the carrier between picture fields with a vertical control signal. The vertical control signal or impulse may be for a longer time interval than the horizontal control impulses as illustrated in Figure 5 where 156 may represent a vertical control impulse and 157 may represent horizontal control impulses having equal amplitude. In order to produce an impulse having a relatively long period of substantially constant amplitude, the increase in potential at load resistor 158 may also be applied to the grid 159 in tube 160 to cause anode cathode current to flow through the adjustable resistor 161 to charge the condenser 162. As the condenser 162 becomes charged the potential in the plate circuit of trigger tube 163 is impressed on the control electrode 164 of the off and on impulse tube 165. After a suitable length of time depending on the value of resistor 161 and condenser 162 the electrons may flow from the cathode 166 to the anode 167 causing a voltage drop at resistor 168 which is applied to the control electrode 169 initiating a positive impulse to trigger tubes 138 and 163 discharging the condensers 132 and 162 to return the cathode ray to start the first line in the next field, and terminating the impulse over conductor 155. The vertical control impulse over conductor 155 may also be applied over the connecting conductor 170 to the grid 130 of the horizontal trigger tube 104 to return the cathode ray horizontally each time it is returned vertically and maintaining the tube 104 conductive for the entire duration of the vertical impulse which in turn maintains the electron ray substantially extinguished for the same period.

From the above description it is seen that a vertical control impulse may be produced at the end of each field to initiate both the vertical and horizontal retrace, to extinguish the electron ray during retrace, and to modulate the carrier with a relatively wide control impulse between pictures. Furthermore, line and frame frequency may be varied to meet any operating condition.

To provide interlace scanning where the lines of one field fall in between the lines of the previous field, I provide means for initiating the backward horizontal deflection of the ray from substantially the mid point of the screen for the first horizontal line in alternate fields. In order to trigger tube 104 at the mid point of a line, the increase of potential at the load resistor 158 occurring at the end of each scanned field is applied to the grid 171 to cause anode cathode current to flow for a short period of time through the adjustable resistor 172 to charge the condenser 173. As the condenser 173 receives a charge at the end of each forward vertical trace the potential in the first plate circuit of tube 174 is impressed on the control electrode 175 of the impulse tube 176. The values of the resistor 172 and condenser 173 are chosen so that at the end of alternate field periods or for each two momentary charges of current through the resistor 172 the control electrode 175 will become sufficiently positive to permit current to flow from battery through load resistor 177 and anode 178. The voltage drop at resistor 177 may be applied to the control electrode 179 thereby increasing the potential at load resistor 180 which may be applied to grid 181 in tube 182. The increased potential on grid 181 may permit current to flow from the plate 183 to the cathode 184 when the potential on control grid 185 is increased. The control electrode 186 in the impulse tube 123 may be connected to the resistor 121 and adjusted so that as the horizontal saw tooth potential is increasing the control electrode 186 will become sufficiently positive when the cathode ray has reached substantially the mid point of the screen of further along when sound signals and auxiliary signals are modulated on the same carrier wave, to permit current to flow from battery through load resistor 188 and anode 189. The voltage drop at resistor 188 may be applied to the electrode 190 to increase the potential at load resistor 191 and on the grid 185 in tube 182 each time the electron ray reaches substantially the mid point of the screen on its forward trace. Should the grid 181 be sufficiently positive which is the condition in alternate fields as explained above, current will flow through tube 182 causing a voltage drop at resistor 192 which may be applied to the control grid 193 in tube 174. The voltage drop on grid 193 causes a high potential pulse at load resistor 194 which may be applied to the grids 130 and 195 to render tubes 104 and 174 conductive thereby discharging condensers 98 and 173 to return the electron ray to start the next horizontal line, and restore the impulse tube 176 to its normal condition. The impulse at resistor 194 may also be applied to the conductor 131 to modulate the carrier wave.

From the above description it is shown that the electron ray will be returned or deflected backwards from substantially the mid point of the screen in the first line in alternate fields which will place the lines in one field in between the lines of the previous field; also the carrier wave will be modulated with a control signal as illustrated at 196, Figure 5, in alternate fields to control the horizontal backward deflection of the electron ray in the receiver from the mid point of the screen, to be further explained later.

From the description it is shown that the horizontal control impulses are produced in groups separated by vertical control impulses of longer duration for controlling the scanning actions at the transmitter, and that these impulses are modulated on a carrier wave for controlling similar scanning actions at the receiving stations.

To shift the images horizontally in alternate fields on the viewing tube screen to give the appearance of depth in the reproduced images, I provide means at the transmitter to slightly vary the horizontal velocity of the electron ray across the mosaic screen in different fields so that the reproduced images in the odd numbered lines at the viewing tube will be slightly shifted to one side relative to the images in the even numbered lines, which is illustrated in Figure 6 by the odd numbered lines 197 and the even numbered lines 198. The image 199 reproduced in part in the odd numbered lines as illustrated at 200 would be slightly wider and slightly to the left of the images 199 reproduced in part in the even numbered lines as illustrated at 201. The number of lines per field should be relatively high to produce a graying fringe or edge on either side of black image.

The high potential impulse produced at load resistor 194, Figure 4, to cause horizontal deflection at the mid point of a line may also be applied through switch 202 to the grid of slow acting tube 203 causing current to flow from battery through load resistor 204, luminescence material coated anode 205 to the cathode causing the luminescence material of relatively slow decay to glow, thus illuminating the photocell cathode 206 thereby permitting current to flow through the load resistor 207. The voltage drop at resistor 207 applied to grid 208 in tube 108 reduces the amplitude or adjusts the velocity of the horizontal saw tooth wave each time the horizontal deflection is stopped in the middle of the first line or in alternate field periods. The brilliancy of anode 205 may be controlled by the current through the triode which will also adjust the period of decay for the luminescence material on the anode to substantially equal one field period. This slow acting tube is shown in my co-pending application Serial Number 541,941, filed June 24, 1944, Patent No. 2,425,877, issued August 19, 1947. Briefly this tube comprises a triode having an anode 205 of mesh material covered with luminescent material of relatively slow decay. As the electrons strike the plate it may glow with a brilliancy determined by the grid and plate potentials. Adjacent to the anode is a photo-electric device comprising a cathode 206 adapted to emit electrons by the brilliancy of the plate.

From the above description it is shown that the images on the mosaic may be scanned at a slightly faster rate in the odd numbered line fields relative to the line scanning rate in the even numbered line fields.

The operation of key 25, Figure 2, supplies variable saw tooth potential from the load resistor 142, Figure 4, over conductors 29 and 30, switch 31, conductor 33 to periodically increase the signal output of picture amplifier 48, and may also provide periodically increasing amplification over conductor 32 to the sound reactance amplifier in the frequency modulated sub-channel. The operation of key 25 also modulates the carrier wave with signaling currents in spaced periods of time through the amplifier 50 to actuate an alarm at the receiving station to inform the attendant that a jumble or distorted signal program is being broadcast. The operation of key 26 supplies variable saw tooth potential from the load resistor 143 over conductors 29 and 30, and switch 31 to provide periodically decreasing amplification over the same circuits as described above to the picture and sound amplifiers. The operation of key 26 modulates the carrier wave with alternating current in other recurring periods through the amplifier 51 to automatically control the receiving stations for the reception of signals having periodically decreasing signals. The operation of key 211, Figure 2, may modulate the carrier with alternating current through an amplifier similar to 51, not shown, in still another spaced period of time to modify the picture and sound signals at the receiver in accordance with a sine form wave developed at 27. The picture and sound amplifiers at the transmitter may be varied through the operation of key 211 by current from 27. The operations at the receiving station will be more fully explained later.

The picture alignment mark panel in Figure 7 comprises three vertical members 206', one each of blue, red and green secured to one side and the bottom of the frame 210. The frame may be placed in the compartment 5 in front of tube 1 so that light rays directed through the members will form a vertical and horizontal image on each of the screens 2, 3 and 4. These images will be reproduced on the viewing tube screen so that the lenses or mirrors for each colored image may be adjusted for proper alignment on a common screen.

With reference to Figure 8, showing a receiving station, the antenna 212 receives the modulated carrier waves from the transmitting antennas 42 and 47 to a radio frequency amplifier 213. An oscillator 214 reacts with these signals in the first detector stage 215 to produce two intermediate frequency signals which are supplied to the intermediate frequency stages 216 and 217. After suitable amplification the video signals, sound signals, a number of groups of auxiliary signals and synchronizing or control signals are demodulated at 218. The control signals being of greater amplitude are separated and fed to the horizontal and vertical deflecting apparatus and associated circuits 219 and 220 to control the scanning actions in the viewing tube 222. The video signals, sound signals and auxiliary signals are fed from the second detector 218 to the message distributor 223 where the several signals are separated and allotted suitable periods of time and then fed to the individual power amplifiers 224, 225, 226, 227 and 228. The picture signals are supplied to the power amplifier 224, and sound signals representative of special messages are supplied to the power amplifier 225. The several groups of auxiliary signals are supplied to the power amplifiers 226, 227 and 228. The video or picture signals are fed from the amplifier 224 to the viewing tube 222. The viewing tube 222 is represented as being in the form of a cathode ray tube of a conventional type and comprises a fluorescence screen 229, an electron gun for developing a ray of electrons directed toward the screen, and two sets of electrostatic plates for deflecting the electron ray at the line and field frequencies to cause it to scan the screen. The video signals are applied to the control electrode of the electron gun, whereby, the intensity of the electron ray is made to vary with the picture signals. The horizontal saw tooth voltages are fed over conductor 230 to the message distributor 223 for controlling the several time periods.

Since picture signals may be produced from three images per field at the transmitter there will be three similar images reproduced on the viewing tube screen 229. In front of these images there may be colored filters, blue 231, red 232 and green 233. Light rays from the fluorescence screen 229 directed through the filter 233 are reflected at the opaque mirror 234 through the back of the partially silvered mirror 235 (some of rays being lost) and reflected at right angles from the reflecting surface of the partially silvered mirror 236 to the frosted screen 237. Light rays from the screen 229 directed through the filter 232 are reflected from the reflecting surface of the partially silvered mirror 235 toward mirror 236, rays passing through mirror 235 being lost. Some of the rays reaching the partially silvered mirror 236 are lost, and others are reflected at right angles toward the screen 237. Light rays passing through the filter 231 are passed in part through mirror 236 onto the screen 237 where the three images are made to coincide by the adjustment of the mirrors in the compartment 238 through the aid of the alignment marks 208' and 209 as previously described.

Sound signals from the power amplifier 225 are supplied to the normally open contact of key 239.

Alternating current signals from the amplifiers 226, 227 and 228 may be supplied through switch 240 to the alarm apparatus 241, signal distorting apparatus 242 or the telemetering and facsimile apparatus 243. The alarm apparatus may provide an alarm for the type of service to indicate the brush position for the switch 240, so that proper amplification of the incoming signals may be provided by either supplying saw tooth voltages from the vertical deflecting apparatus 220 over conductors 244 or 245 to the signal distorting apparatus 242, or supplying alternating voltages from an oscillator, not shown, to the signal distorting apparatus. The output of the signal distorting apparatus may be supplied through switch 246, conductors 247 and 248 to either or both the picture amplifier 224 and the sound amplifier 249.

The alarm apparatus may also indicate when it is desired to utilize the receiving station for facsimile or telemetering purposes, in which case another transmitter 250 would be controlled through the apparatus 243.

The sound signals related to the pictures and supplied to the intermediate frequency stage 217 where after suitable amplification they may be supplied through the limeter 251 to the discriminator 252. After detection in 252 the signals are fed to the power amplifier 249 then applied through key 239 to the loud speaker 253. The operation of key 239 transfers the loud speaker from the reception of signals from the frequency modulated channel through the amplifier 249 to the reception of sound signals for another message, such as data or weather reports, modulated on the picture signal carrier through the amplifier 225.

An auxiliary receiver or an alert system is provided through the key 254 in its normal position arranged for wide band reception of signals on a number of channels, so that the receiving station may be signaled or alerted from any one of a number of transmitting stations. The key 254 in its operated position as shown in Figure 8 disconnects the coil 255 from the antenna 212, opens the power feeders to the auxiliary receiver and places the main receiver in condition for the reception of picture and other signals. Audible or subaudible signals received over a carrier wave are demodulated at 256 and all signals above a certain frequency are applied through the series resonance circuit comprising an inductance 257 and condenser 258 to the grid of tube 259. After suitable amplification in 259 the signals are applied to the thermostatic time delay device 260. Should the signals continue for a relatively long period of time the device 260 will be flexed to close a circuit to the alarm 261. The purpose of the time delay device is to prevent short burst of static from bringing in the alarm. The alarm signals transmitted may be for a single long period, or they may be interrupted to give a number of alarms to signal by code individual receiving stations or groups of receiving stations. The main receiver is deenergized, and disconnected from the antenna 212 when the key 254 is in normal position. Key 262 may be operated to off position when it is desired to eliminate the pictures, but receive all other messages.

With reference to Figure 9, the message distributor 223 for alloting suitable periods of time in the interval of a saw tooth wave for several received messages comprises three or more off and on impulse tubes 263, 264 and 265 for controlling the power amplifiers 224 through 227, and a multiunit tube 266 for separating control signals from the picture, sound and auxiliary signals. The tubes 263, 264 and 265 are controlled by saw tooth voltages developed in the apparatus and associated circuits of Figure 10 and applied over conductors 267, 268 and 269 to the control electrodes 270, 271 and 272 which may be adjusted in the circuits of Figure 10 so that the potential on the control electrode 270 may permit the electrons from the cathode 273 to flow to the anode 274 at the time the electron ray in the cathode ray tube 222 reaches the leaving edge of the screen 229, so that received picture signals from the detector 218 may be supplied to the control grid of the power amplifier 224, and after suitable amplification in this tube they are applied over conductor 276 to the control grid of the viewing tube 222 where they are reproduced on the forward horizontal movement of the ray. As soon as current flows from the anode 274 to the cathode 273 a voltage drop is developed at the load resistor 277 which is applied to the grid 278 to render tube 224 inoperative to any further signals applied to its control grid during further increases in the saw tooth potential or during the time that sound signals, auxiliary and control signals are being received on the common carrier wave. The drop in potential at resistor 277 is also applied over conductor 279 to the control grid of viewing tube 222 to substantially extinguish the electron ray during reception of sound and auxiliary signals or during further increases in the saw tooth voltages developed in the circuits of Figure 10.

The potential drop at resistor 277 is applied to the control electrode 280 which may rotate or block the electrons from the anode 281, thereby increasing the potential at load resistor 282 and to the grid 283 in tube 225, thus permitting received sound signals applied to the control grid 284 to be amplified in tube 225, and supplied to the loud speaker 253, immediately after the reproduction of the picture signals, whenever key 239 is operated. A short period of time after the reception of sound signals the saw tooth voltage on control electrode 271 will have increased to permit current to flow from the anode 285 to the cathode 286 thus producing a potential drop at the load resistor 287 which is applied to the grid 288 thus blocking tube 255 to any signals on the control grid during further increases in the saw tooth potentials. The drop in potential at resistor 287 is also applied to the control electrode 289 rotating or blocking current flow from the anode 290, thereby increasing the potential at resistor 291 and grid 292. As soon as the potential on grid 292 is increased the tube 226 becomes sensitive to received alternating current signals or the first series of auxiliary signals. After tube 226 becomes conductive for a relatively short period of time the saw tooth voltage on control electrode 272 will have increased to permit current to flow from the anode 293 to the cathode 294 producing a potential drop at resistor 295 which is applied to the grid 296, thus blocking tube 226 to any signals on the control grid during further increases in saw tooth potential. The drop in potential at resistor 295 is also applied to the control electrode 297 rotating or blocking current flow from the anode 298, thereby increasing the potential at resistor 299 and grid 300. As soon as the potential on grid 300 is increased the tube 227 becomes conductive to alternating current signals in the second series of auxiliary signals. After the tube 227 becomes sensitive to signals on its control grid for a short period of time the tube 227 will become blocked and another amplifier 228 not shown but similar to 227 will become conductive to signals for a third series of auxiliary signals. The last power amplifier to be employed such as tube 227 shown in Figure 9 becomes blocked by negative potential on its grid through control impulses received over the carrier wave, as will presently be explained.

Control signals demodulated at 218, Figure 8, are blocked from effecting the power amplifiers 224, 225 and 226 as explained above. However, received horizontal and vertical control impulses of relatively high amplitude as illustrated in Figure 5 may be applied to the grid 301 of amplifier 266, the grid being biased to prevent picture or sound signals from effecting the output. The control impulses applied to the grid 301 causes a voltage drop at resistor 302 which is applied to the grid 303 of tube 227 to block this tube during retrace. The impulses in the first anode circuit of tube 266 are also applied to the grid 303 and after suitable amplification in the second anode cathode circuit of tube 266 the impulses are fed over conductor 304 to the circuits of Figure 10 to control or trigger the saw tooth voltages and restore the circuits of Figure 9 to start reception of another group of signals comprising picture, sound and several auxiliary signals.

With reference to Figure 10 the apparatus and associated circuits 219 for deflecting the electron ray horizontally and for producing the saw tooth potentials to control the circuits of Figure 9 comprise a condenser 305 charged through an adjustable resistor 306 from a source of potential as indicated, another condenser 307 and resistor 308 may be employed to change the charging rate.

When the condenser 305 becomes charged, the saw tooth voltage wave in the plate circuit of tube 309 is impressed on the grids 310 and 311 of multiunit tubes 312 and 313 through adjustable contacts on resistors 314 and 315. The double anode output of the amplifier 313 supplied to the load resistors 316 and 317 will change the potential on the horizontal deflecting plates 318 and 319 of tube 222 to effect in a well known manner the horizontal movement of the electron ray.

The output of tube 312 at resistor 320 through 324 supplies potential variations to the control electrodes in tubes 263, 264 and 265 in Figure 9 over conductors 267, 268 and 269.

Control signals from conductor 304 applied to the grid of trigger tube 309 renders this tube conductive to discharge condenser 305 and to restore the circuits of Figure 9 to start the next group of received signals. Regardless of when the horizontal signals are received the tube 309 may become conductive to discharge the condenser 305 to return the electron ray from any point reached on the screen to start the next line, therefore, the horizontal scanning action may be synchronized with the transmitter upon the reception of the first horizontal control signals.

To initiate the discharge of condenser 305 in the absence of control signals due to fading or when tuning the set, I provide an impulse tube 325 having a control electrode 326 connected to the load resistor 320. As the saw tooth voltage increases to a suitable amplitude, to cover the predetermined time periods for picture, sound and auxiliary signals the electrode 326 becomes sufficiently positive to permit current to flow through the load resistor 327, causing a voltage drop to be applied to the control electrode 328 to produce a positive impulse which may be applied to the grid of the trigger tube 309 rendering this tube conductive to discharge the condenser 305.

The apparatus and associated circuits 220 for producing vertical sweep voltages comprise a condenser 329 charged through an adjustable resistor 330 from a source of potential as indicated. Another condenser 331 may be charged through resistor 332 from a source of potential to vary the frame or field frequency, for vertical deflection. As the condenser 329 becomes charged the increasing potential in the plate circuit of tube 333 is supplied through the adjustable contact on resistor 334 to the grid 335 of multiunit tube 336. The double anode output of amplifier 336 is fed through load resistors 337, 338, 339 and 340 which changes the potential on the vertical deflecting plates 341 and 342 of tube 222 to effect the vertical movement of the electron ray.

Horizontal and vertical control signals from conductor 304 are impressed on the control grid of trigger tube 309 and also to the grids of the double unit tube 343. The vertical control signals or impulses will trigger the tube 309 to discharge the condenser 305 thus deflecting the cathode ray backward horizontally each time a vertical control signal is received. The control signals both horizontal and vertical impressed on the grids of tube 343 cause current to flow from the anode 344 to the cathode to charge the condenser 345 through the adjustable resistor 346. The increasing potential on the plate of tube 347 is applied through the adjustable resistor 348 to the control electrode 349 in impulse tube 350. Impulses of short duration or horizontal control impulses will not increase the potential on the electrode 349 sufficiently to permit current to flow from the anode 351. However, an impulse of relatively long duration or a vertical control signal causes the condenser 345 to be charged over a longer period of time, thereby increasing the potential on electrode 349 to permit the electron to flow to the plate 351 causing a voltage drop at load resistor 352, which is applied to the control electrode 353 blocking the current through resistor 354 to increase the potential applied to the grid of trigger tube 333, causing this tube to become conductive, discharging the condenser 329, and causing the vertical backward deflection of the electron ray.

The control signals impressed on the grids of tube 343 charge and discharge the condenser 345. As the control impulse is initiated on the grid 355, current flow through the anode 356 is increased causing a voltage drop to be applied to the grid of trigger tube 347, but as the grid 355 is restored to normal or becomes more positive causing this tube to become conductive, discharging the condenser 345.

From the above it is seen that the condenser 345 will be charged and discharged for each received control impulse both horizontal and vertical. But only the vertical control impulses of relatively long duration cause the discharge of condenser 329 to deflect the electron ray backward vertically.

To initiate the discharge of condenser 329 in the absence of vertical control signals due to fading or when tuning the set, I provide an off and on impulse tube 357 having its control electrode 358 connected to the load resistor 339. As the saw tooth voltage increases to a suitable amplitude to cause the electron ray to be deflected over the desired screen height, the electrode 358 becomes sufficiently positive to permit current to flow through the load resistor 359 causing a voltage drop to be applied to the electrode 360 blocking the current flow through resistor 361, thereby producing an impulse which may be applied to the control grid of trigger tube 333.

When the transmitting stations are not provided with apparatus for producing the third dimensional effects, I provide apparatus in the receiver for changing the velocity of the electron ray in alternate fields to produce images offset horizontally in the alternate fields relative to the images in the intermediate fields. The trigger impulse produced at resistor 354 may be applied through switch 362 to the grid 363 of tube 364, causing current to flow from the anode 365 to the cathode to charge the condenser 366 through the resistor 367 upon the reception of each vertical control signal. The increasing potential on the plate 368 may be applied to the control electrodes 369 of off and on tube 370. Two trigger impulses are required to charge the condenser 366 sufficiently to cause the electrode 369 to become sufficiently positive to permit current flow through load resistor 371 causing a potential drop which is applied to the control electrode 372 blocking current through load resistor 373. The increased potential at resistor 373 may be applied to the triode grid in slow acting tube 374 causing current flow through resistor 375, thereby producing a glow in the luminescence material of relatively slow decay on the anode 376, thus illuminating the photocell cathode 377 thereby permitting current flow through resistor 378 and cathode 377 to ground potential. The voltage drop at resistor 378 is applied through the switch 379 to grid 380 to reduce the current flow through the tube 313 thereby adjusting the horizontal velocity of the electron ray across the screen of tube 222 in certain fields which causes the images in one field to be horizontally offset relatively to the images in the next succeeding field as previously explained in connection with Figure 6. It is to be understood that both the apparatuses at the transmitter and at the receiver for producing third dimensional effects would not be used at the same time.

The switches 362 and 379 may be actuated to disconnect the apparatus for producing third dimensional effects at the receiver, thereby causing the ray to scan all fields at the same rate, or the switch 379 only may be operated, to disconnect the grid 380 and to connect the apparatus over conductor 381, switch 382 Figure 9 to the grid 383 in tube 224, whereby negative potential is applied to the grid 383 in alternate fields to reduce the intensity of the electron ray in the viewing tube 222 in alternate fields, thus causing the images in alternate fields to be more of a gray color than the images in the intermediate fields, thereby producing a third dimensional effect on the viewing tube screen.

From the above it has been shown that the velocity of the electron ray or its intensity may be of a different value in alternate fields relative to velocity or intensity in the intermediate fields to produce the appearance of depth in the images on the viewing tube screen.

From the above description it is seen that horizontal and vertical scanning actions may be controlled by impulses of equal amplitude but of unequal duration, also that the vertical control signals cause both the vertical and horizontal retrace, so that upon reception of a vertical control signal the electron ray is deflected backward both vertically and horizontally from any point it has reached on the screen to immediately synchronize the receiver with the transmitter. Furthermore since the horizontal control signals produced at the transmitter include an impulse to cause the electron ray to be deflected backwards from the mid point of the screen for the first line in alternate fields, the electron ray in the receiving tube will likewise be deflected backward upon reaching substantially the mid point of the screen in alternate fields to affect interlace scanning.

It is to be understood that picture signals only may be transmitted, in which case the sweep potentials may only be of such value as to cause the deflection of the electron ray across its associated screen.

With reference to Figure 11 I have shown a cathode ray viewing tube 384 having an arrangement of colored screens and lenses to project three images from its screen to a common area on a distant screen. The tube 384 may replace the tube 222 in Figure 8. The colored screens 385, 386 and 387 may be similar to those in Figure 8. The lenses 388, 389 and 390 may be arranged or adjusted to project the images to properly coincide on a distant screen 391 through the aid of several alignment marks transmitted as illustrated in Figure 7.

The fragmentary portion of alternating current signal output of amplifiers 226 and 227 in Figure 9 may be supplied over conductors 404 and 405 to the switch 240, as illustrated in Figure 8, to control the alarm and also the signal distorting apparatus. The conductor 414 may supply saw tooth potentials from the saw tooth deflecting apparatus 220, as illustrated in Figure 8, through switch 382 to grid 383 to attenuate the picture signals output when the received picture signals are being accentuated.

In the various circuits shown and described I have simplified the drawings by indicating the source of potential by a sign. Also I have omitted the heater filaments for the various tubes, but it is to be understood that such filaments are necessary.

The embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

Having thus described my invention, I claim:

1. In a television system, a transmitter comprising a plurality of image screens, each of said screens being adapted to be excited by light rays of a different color, a color filter for each of said screens, each of said filters adapted to pass a different color of light rays, means comprising mirrors to pass or reflect different portions of the light rays, from a scene within the view of said transmitter, toward each of said filters to produce partial images on each of said screens in accordance with a different color in said scene, said last means including horizontal and vertical image alignment markers to produce horizontal and vertical image alignment marks forming a part of the images on each of said screens, and means to produce picture signals representative of the images on each of said screens.

2. In a television system, a cathode ray tube having a plurality of image screens and an electron ray adapted to scan said screens, each of said screens being adapted to be excited by light rays of a different color, a color filter for each of said screens, each of said filters adapted to pass a different color of light rays, optical means disposed in alignment with one only of said screens to direct light rays from a scene within the view of the optical means toward said one screen and its associated color filter, means comprising light ray reflecting and passing devices to cause different portions of the light rays received from said optical means and directed toward said one screen to pass through each of said filters to produce images on each of said screens in accordance with a different natural color in said scene, colored image markers associated with said optical means to produce a different picture alignment mark, in the images, on each of said screens, means to deflect the electron ray in bi-dimensional directions to scan said screens to produce picture signals representative of the images on each of said screens, means to transmit said signals, a receiving station provided with an image screen, means at said station to reproduce a number of said images, including said picture alignment marks, in different locations on said screen from said signals, a distant screen, and means comprising mirrors to pass and/or reflect light rays from said images to superimpose said images on said distant screen with said picture alignment marks in a straight line to produce complete color pictures.

JOHN H. HOMRIGHOUS.

REFERENCES CITED

The following references are of record in the file of this patent:

UNITED STATES PATENTS

| Number | Name | Date |
|---|---|---|
| 2,107,464 | Zworykin | Feb. 8, 1938 |
| 2,289,157 | Whitaker | July 7, 1942 |
| 2,294,820 | Wilson | Sept. 1, 1942 |
| 2,337,980 | Du Mont | Dec. 28, 1943 |
| 2,375,966 | Valensi | May 15, 1945 |
| 2,335,180 | Goldsmith | Nov. 23, 1945 |
| 2,389,645 | Sleeper | Nov. 27, 1945 |
| 2,389,646 | Sleeper | Nov. 27, 1945 |